(12) United States Patent  (10) Patent No.: US 7,818,422 B2
Patiejunas  (45) Date of Patent: Oct. 19, 2010

(54) REAL-TIME MONITORING OF A ROUTING SERVER

(75) Inventor: Kestutis Patiejunas, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 11/967,486

(22) Filed: Dec. 31, 2007

(65) Prior Publication Data

US 2009/0172152 A1   Jul. 2, 2009

(51) Int. Cl.
*G06F 15/173* (2006.01)
(52) U.S. Cl. .................................... 709/224; 709/225
(58) Field of Classification Search ............... 709/224, 709/225
See application file for complete search history.

(56) References Cited

U.S. PATENT DOCUMENTS

| 5,793,976 | A | | 8/1998 | Chen et al. |
| 5,805,602 | A | | 9/1998 | Cloutier et al. |
| 6,012,096 | A | * | 1/2000 | Link et al. ............... 709/233 |
| 6,411,998 | B1 | * | 6/2002 | Bryant et al. ............ 709/224 |
| 6,594,268 | B1 | | 7/2003 | Aukia et al. |

(Continued)

FOREIGN PATENT DOCUMENTS

KR   20030028270 A   4/2003
KR   100715683 B1   5/2007

OTHER PUBLICATIONS

Notification of Transmittal of The International Search Report and the Written Opinion of the International Searching Authority in International Application No. PCT/US2008/088531, dated Jun. 17, 2009, 14 pgs.

(Continued)

*Primary Examiner*—Joon H Hwang
*Assistant Examiner*—Mark Pfizenmayer
(74) *Attorney, Agent, or Firm*—Senniger Powers LLP

(57) ABSTRACT

Calculating the roundtrip delay between first and second computers due to the latency of a routing server. The first computer receives an incoming message from the second computer via the routing server. The incoming message includes incoming time information indicative of processing time at the second computer and outgoing time information indicative of a time when a first outgoing message was sent by the first computer. The first computer calculates an observed roundtrip time indicating the routing server latency for a first outgoing message and the incoming message as a function of a time when the first computer received the incoming message, the outgoing time information, and the incoming time information.

7 Claims, 6 Drawing Sheets

U.S. PATENT DOCUMENTS

| | | |
|---|---|---|
| 6,751,573 B1 | 6/2004 | Burch |
| 6,801,940 B1 | 10/2004 | Moran et al. |
| 7,012,900 B1 | 3/2006 | Riddle |
| 7,035,210 B2 | 4/2006 | Walles |
| 7,151,749 B2 | 12/2006 | Vega-Garcia et al. |
| 2002/0059170 A1* | 5/2002 | Vange .......................... 707/1 |
| 2002/0072358 A1 | 6/2002 | Schneider et al. |
| 2006/0007878 A1 | 1/2006 | Xu et al. |
| 2006/0010243 A1 | 1/2006 | DuRee |
| 2006/0218285 A1* | 9/2006 | Talwar et al. ............... 709/227 |
| 2007/0061674 A1* | 3/2007 | Hansen et al. .............. 714/758 |
| 2008/0034110 A1* | 2/2008 | Suganthi et al. ............ 709/238 |

OTHER PUBLICATIONS

Park, Ju-Won, et al., "Hybrid Monitoring Scheme for Real-time Media Delivery over the Multicast Network," available at http://netmedia.gist.ac.kr/~agmonitor/papers/p42-Ju-Won.pdf, 7 pages.

Song, Han Hee, et al., "Real-time End-to-end Network Monitoring in Large Distributed Systems," available at http://www.cs.utexas.edu/~hhsong/paper/hhsong-coms07.pft, 10 pages.

Unknown, "Converged Network Analyzer," available at http://www.avaya.com/gcm/nnaster-usa/en-us/products/offers/converged_network_analyzer.htm&View=ProdDescFuncAttrib, 6 pages.

* cited by examiner

REAL-TIME MONITORING OF A ROUTING SERVER

BACKGROUND

Remote desktop applications have been developed so a user can access a remote desktop server (e.g., the user's home computer or the user's work computer) over the Internet using a routing server from any other computer (the remote desktop client) connected to the Internet. For a typical remote desktop scenario, it is very important that messages are passed with minimum delay through the routing server so the user does not experience unacceptable response times. For example, if the roundtrip message delay is approximately 150 milliseconds, a user will have a great experience, similar to sitting at the user's home or work computer. If the roundtrip message delay is approximately 250 milliseconds, the user experience may suffer, but is willing to accept the delay. And if the roundtrip message delay increases to approximately 350 milliseconds, the user experience will significantly degrade and user will have a very low satisfaction rate.

Also, it can be difficult to measure and calculate these delays because the three computer systems (the remote desktop client, the remote desktop server and the routing server) have clocks that cannot be synchronized.

SUMMARY

Aspects of the invention provide improved calculation of roundtrip latency calculations involving one or more routing servers. Furthermore, it is beneficial for both a remote desktop client and a routing server to know the amount of delay to minimize the impact to the user. For example, a typical remote desktop system includes multiple routing servers. If the remote desktop client determines the response times from the remote desktop server is increasing, the remote desktop client can send its messages through one of the other routing servers. And because the routing server can monitor the response time, the routing server can refuse additional connections from other users so that a user's experience does not degrade to an unacceptable level.

In one aspect, the invention allows a first computer calculates the roundtrip delay between the first computer and a second computer due to the latency of a routing server. The first computer receives an incoming message from the second computer via the routing server. The incoming message includes incoming time information indicative of processing time at the second computer and outgoing time information indicative of a time when an outgoing message was sent by the first computer. The first computer calculates an observed roundtrip time indicating the routing server latency for the outgoing message and incoming message as a function of a time when the first computer received the incoming message, the outgoing time information, and the incoming time information.

In another aspect, the first computer selects a routing server from a plurality of available routing servers based on the calculated observed roundtrip time. In yet another aspect, the incoming message and the outgoing message includes a latency data structure for storing the calculated observed roundtrip time.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
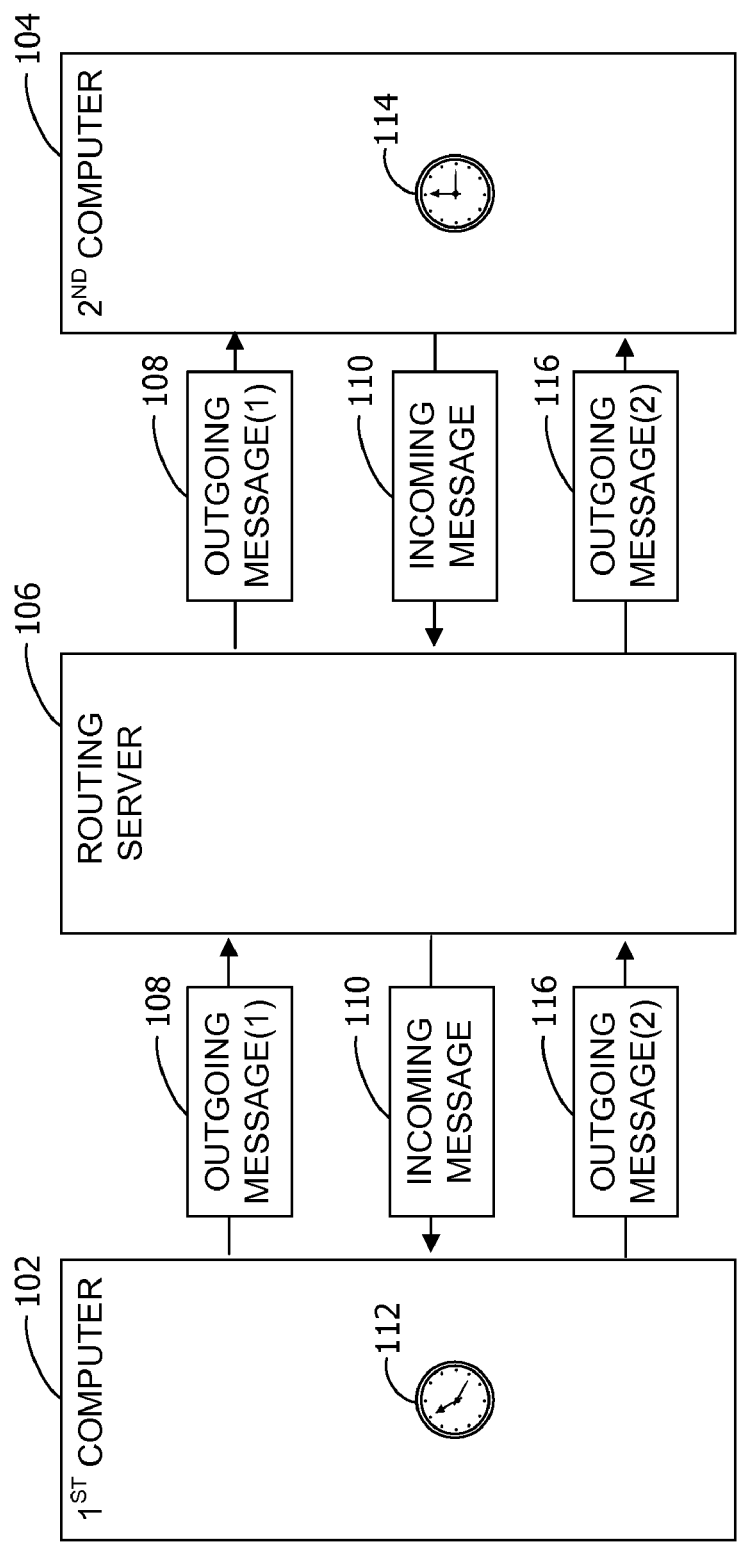
FIG. 1 is a block diagram illustrating one example of a suitable computing system environment in which the invention may be implemented.

Referring now to the drawings, an embodiment of the invention allows a first computer, routing server, and a second computer to calculate network bandwidth and delay information. In particular, the invention includes determining the latency of a routing server based on a time a first computer sends an outgoing message, a time the first computer receives an incoming message from the second computer, and a processing time of the second computer.

FIG. 1 is a block diagram illustrating one example of a suitable computing system environment for determining the round trip latency between a first computer 102 and a second computer 104 due to a routing server 106. The first computer 102 sends a first outgoing message 108 to the second computer 104 via the routing server 106. The first outgoing message 108 includes outgoing time information indicative of a time when the first outgoing message 108 was sent by the first computer 102 according to a first clock 112 associated with the first computer 102.

In response to receiving the first outgoing message 108, the second computer 106 sends the incoming message 110 to the first computer 102 via the routing server 106. In an embodiment, the first computer 102 is a remote desktop client, the second computer 104 is a remote desktop server, the routing server 106 is a remote desktop routing server, and the outgoing message 108 and the incoming message 110 are in a remote desktop protocol (RDP) format.

The incoming message 110 includes incoming time information indicative of a time when the incoming message 110 was sent by the second computer 104 according to a second clock 114 associated with the second computer 104. The incoming time information also indicates a processing time at the second computer 104. In an embodiment, the processing time at the second computer 104 is equal the difference between the time the first outgoing message 108 was received and the time the incoming message 110 was sent by the second computer 104. The incoming message 110 also includes the outgoing time information from the received outing message.

After the first computer 102 receives the incoming message 110, the first computer 102 determines a time when the first computer 102 received the incoming message 110 according to the first clock 112. And, the first computer 102 calculates a first observed roundtrip time indicating the routing server 106 latency for the first outgoing message 108 and the incoming message 110 as a function of the determined time, the outgoing time information, and the incoming time information. For example, the first observed roundtrip time is equal to the difference between the time when the first outgoing message 108 was sent according to the first clock 112 and the time the incoming message 110 was received according to the first clock 112, minus the processing time at the second computer 104 as indicated by the incoming time information. Advantageously, the first clock 112 of the first computer 102 does not need to be synchronized with second clock 114 of the second computer 114 to determine the routing server 106 latency.

Figure 2:
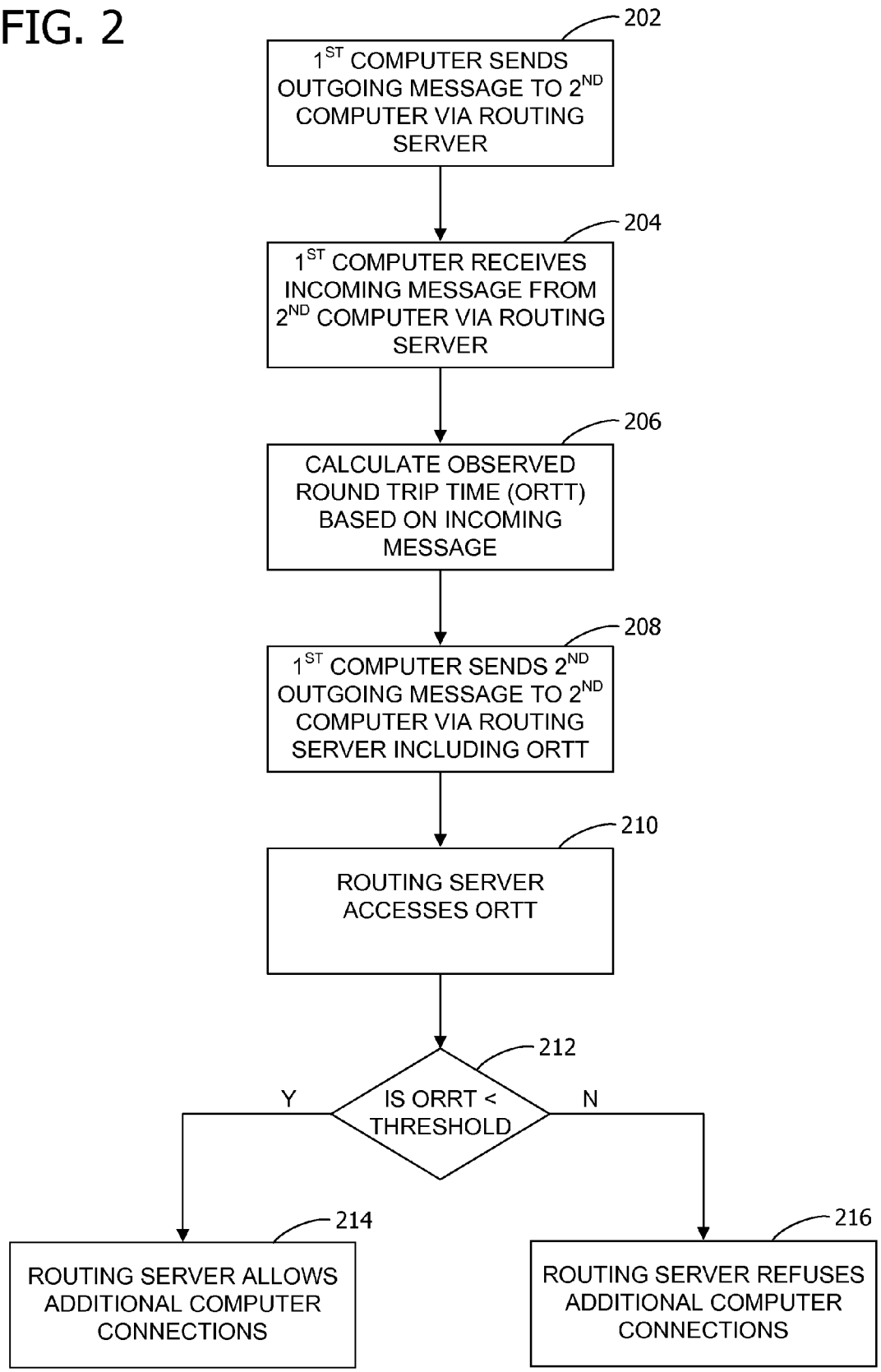
FIG. 2 is an exemplary flow diagram for determining the round trip latency between first computer and second computer due to a routing server.

FIG. 2 is an exemplary flow diagram for determining the round trip latency between first computer 102 and second computer 104 due to a routing server 106. At 202, the first computer 102 sends the first outgoing message 108 to the second computer 104 via the routing server 106. The first outgoing message 108 includes outgoing time information indicative of a time when the first outgoing message 108 was sent by the first computer 102 according to a first clock 112 associated with the first computer 102. In an embodiment, the outgoing time information is included in a header of the first outgoing message 108. In another embodiment, the outgoing time information is not encrypted, but the first outgoing message 108 is encrypted. Advantageously, this allows another computer, such as the routing server 106, to access the outgoing time information without compromising the security of the first outgoing message 108.

At 204, the first computer 102 receives an incoming message 110 from the second computer 104 via the routing server 106. The incoming message 110 is sent by the second computer 104 in response to the receipt of the first outgoing message 108 sent by the first computer 102. The incoming message 110 includes incoming time information indicative of (1) a time when the incoming message 110 was sent by the second computer 104 according to a second clock 114 associated with the second computer 104 and (2) a processing time at the second computer 104. The incoming message 110 also includes the outgoing time information included in the first outgoing message 108.

In an embodiment, a header of the incoming message 110 includes the incoming time information. In another embodiment, the incoming time information is not encrypted, but the incoming message 110 is encrypted. Advantageously, this allows another computer, such as the routing server 106 to access the incoming time information without compromising the security of the incoming message 110. For example, the routing server 106 accesses the incoming time information to track a variety of performance metrics because this information is unencrypted. However, sensitive or personal information (e.g., credit card numbers, home phone numbers) included in the incoming message 110 is encrypted so only the first computer 102 can access this type of information.

Referring further to FIG. 2, the first computer 102 determines, at 206, a time when the first computer 102 receives the incoming message 110 according to the first clock 112. In an embodiment, the first clock 112 and second clock 114 are not synchronized. Also at 206, the first computer 102 calculates a first observed roundtrip time indicating the routing server 106 latency for the first outgoing message 108 and the incoming message 110 as a function of the determined time, the outgoing time information, and the incoming time information. In an embodiment, the first observed roundtrip time is equal to the difference between the time when the first outgoing message 108 was sent according to the first clock 112 and the time the incoming message 110 was received according to the first clock 112, minus the processing time at the second computer 104 as indicated by the incoming time information.

At 208, the first computer 102 sends a second outgoing message 116 to the second computer 104 via the routing server 106 in response to the receipt of a received incoming message 110 from the second computer 104. The second outgoing message 116 includes first observed roundtrip time calculated at 206.

Proceeding to 210 of FIG. 2, the routing server 106 accesses the second first outgoing message 116. And at 212, the routing server 106 determines if the accessed first observed roundtrip time is below a threshold. If so, the routing server 106 allows additional connections from other computers at 214. At 216, if the accessed first observed roundtrip time is above a threshold, the routing server 106 refuses connections from other computers. Alternatively, in an embodiment, the routing server 106 calculates a performance metric related to the routing server 106 according to the accessed first observed roundtrip time and the routing server decides to allow or refuse additional computer connections based on the performance metric.

And, when the second computer 104 receives the second outgoing message 116 sent by first computer 102 at 208, the second computer 104 calculates a second observed roundtrip time indicating the routing sever latency for the incoming message 110 and the second outgoing message 116. For example, the second computer 104 determines a time when the second computer 104 receives the second outgoing message 116 according to the second clock 114. The second observed roundtrip time is equal to the difference between the time when the second outgoing message 116 was sent according to the first clock 112 and the time the incoming message 110 was received according to the second clock 114, minus the processing time at the first computer 102 as indicated by the incoming time information.

Figure 3:
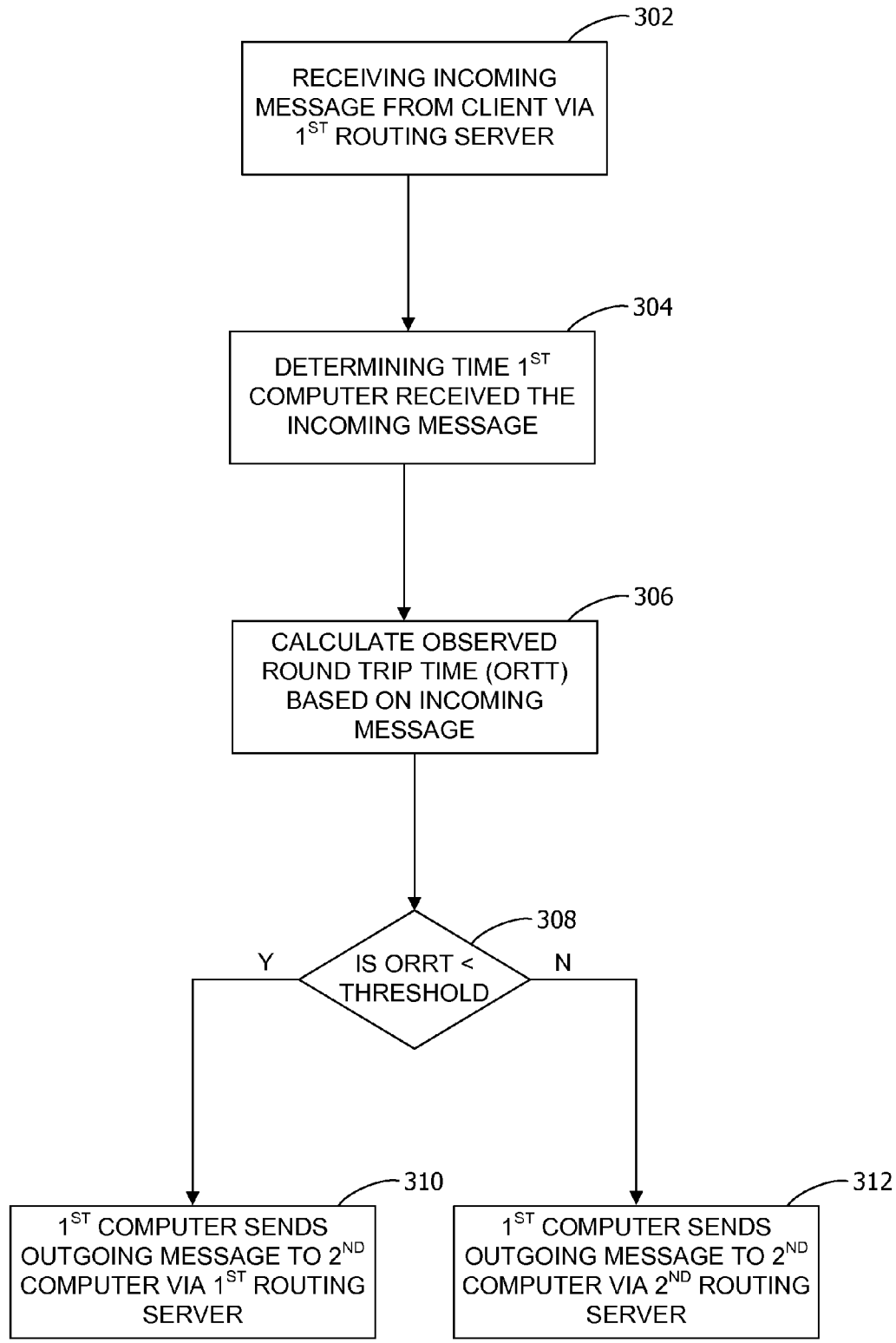
FIG. 3 an exemplary flow diagram for selecting a routing server from a plurality of available routing servers by the first computer.

FIG. 3 an exemplary flow diagram for selecting a routing server 106 from a plurality of available routing servers by the first computer 102. The first computer 102 sends the first outgoing message 108 to the second computer 104 and receiving incoming message 110 from the second computer 108. The incoming message 110 and first outgoing message 108 are sent via at least one of the plurality of routing servers. At 302, the first computer 102 receives the incoming message 110 from the second computer 104 via a first routing server (e.g. routing server 106). The first routing server is one of the plurality of available routing servers.

The incoming message 110 includes incoming time information indicative of a time when the incoming message 110 was sent by the second computer 104 according to the second clock 114. The incoming time information also indicates processing time at the second computer 104. The incoming message 110 also includes the outgoing time information. The outgoing time information is indicative of a time when the first outgoing message 108 was sent by the first computer 102 according to a first clock 112. The incoming message 110 was sent by the second computer 104 in response to the receipt of the first outgoing message 108 sent by the first computer 102.

In an embodiment, the outgoing time information was included in a header of the first outgoing message 108 and the incoming time information is included in a header of the incoming message 110. In another embodiment, the outgoing time information and the incoming time information are not encrypted but, the first outgoing message 108 and incoming message 110 are encrypted.

At 304 of FIG. 3, the first computer 102 determines a time when the first computer 102 received the incoming message 110 according to the first clock 112. In an embodiment, the first clock 112 and second clock 114 are not synchronized. And at 306, the first computer 102 calculates a first observed roundtrip time indicating the first routing server latency for the first outgoing message 108 and incoming message 110 as a function of the determined time, the outgoing time information, and the incoming time information. For example, the first observed roundtrip time is equal to the difference between the time when the first outgoing message 108 was sent according to the first clock 112 and the time the incoming message 110 was received according to the first clock 112, minus the processing time at the second computer 104 as indicated by the incoming time information.

Referring further to FIG. 3, the first computer 102 determines, at 308, if the first observed roundtrip time is below a threshold indicating an acceptable response time between the first computer 102 and second computer 104. If so, at 310, the first computer 102 sends the first outgoing message 108 to the second computer 104 via the first routing server. And, if the first observed roundtrip time is above the threshold, the first computer 102 sends the first outgoing message 108 to the second computer 104 via a second routing server selected from the plurality of available routing servers at 312. The second routing server 106 is different than the first routing server.

In an embodiment, the first computer 102 is a remote desktop client, the second computer 104 is a remote desktop server, the plurality of routing servers are remote desktop routing servers, and the first outgoing message 108, the incoming message 110, and second outgoing message 116 are in a remote desktop protocol (RDP) format.

Figure 4:
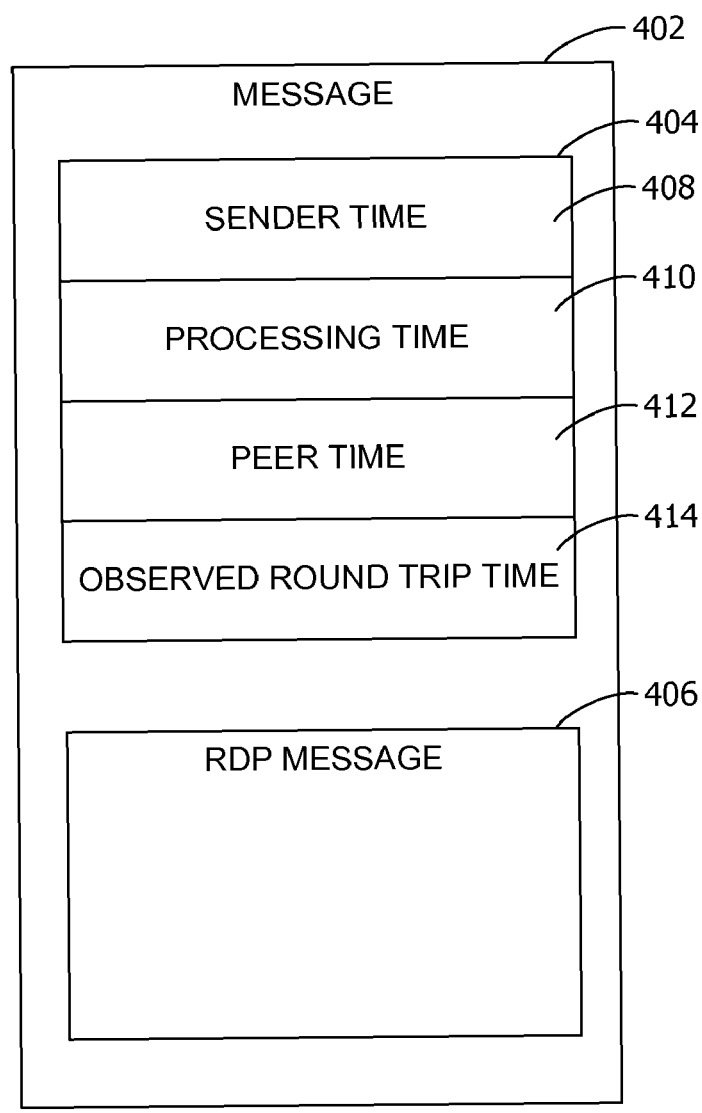
FIG. 4 is a block diagram illustrating an exemplary computer-readable storage medium on which a latency data structure may be stored.

FIG. 4 is a block diagram illustrating an exemplary computer-readable storage medium 402 including a latency data structure 404 of the second outgoing message 402 for tracking an observed roundtrip time between a remote desktop client (e.g., computer 102) and a remote desktop server (e.g., computer 104) via a first remote desktop routing server (e.g., routing server 106) based on a first outgoing message 108 and incoming message 110. The first remote desktop routing server is one of a plurality of available remote desktop routing servers. And the second outgoing message 402, the incoming message 110, and the first outgoing message 108 are in a remote desktop protocol format. The second outgoing message 402 includes a remote desktop protocol message 406.

Figure 5:
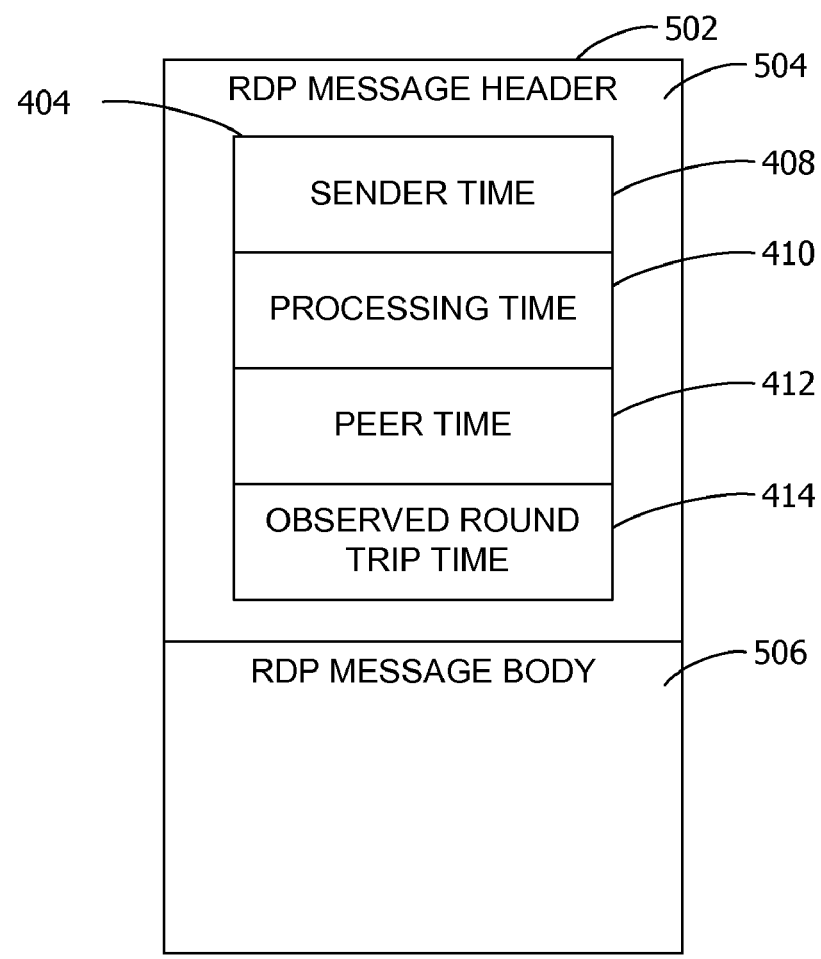
FIG. 5 is a block diagram illustrating an alternative exemplary computer-readable storage medium on which a latency data structure may be stored.

The latency data structure 404 includes a sender time 408, a processing time 410, a peer time 412, and an observed round trip time 414. FIG. 5 is a block diagram illustrating an embodiment of a computer-readable storage medium where the latency data structure 404 is included in a header 504 of the second outgoing message 502. The second outgoing message 502 also includes a remote desktop protocol message body 506. In an embodiment, the latency data structure 404 is not encrypted and the remote desktop protocol message body 506 is encrypted.

Referring again to FIG. 4, the sender time 408 stores the time the second outgoing message 402 was sent by the remote desktop client according to a remote desktop client clock (e.g., the first clock 112) associated with the remote desktop client.

The processing time 410 stores a remote desktop client processing time. In an embodiment, the remote desktop client processing time is equal to the difference between a time the incoming message 110 arrived according to the remote desktop client clock and the time the second outgoing message 402 was sent according to the remote desktop client clock.

The peer time 412 stores a time the incoming message 110 was sent according to a remote desktop server clock (e.g., the second clock 114). The time the incoming message 110 was sent was included in the incoming message 110. In an embodiment, the remote desktop client clock and remote desktop server clock are not synchronized.

The observed round trip time 414 stores a calculated observed roundtrip time for the first remote desktop routing server. In response to receiving the incoming message 110, the remote desktop client calculates the observed roundtrip time. In an embodiment, the observed roundtrip time equal to the difference between a time the first outgoing message 108 was sent and the time the incoming message 110 was received, minus a remote desktop server processing time. The time the first outgoing message 108 was sent and the remote desktop server processing time are included in the incoming message 110.

In another embodiment, the remote desktop client sends the second outgoing message 116 to the remote desktop server via the first desktop routing server if the observed roundtrip time 414 is below a threshold indicating an acceptable response time between the remote desktop client and remote desktop server. And if the observed roundtrip time 414 is above the threshold, the remote desktop client sends the second outgoing message 116 to the remote desktop server via a second desktop routing server. The second desktop routing server is one of the plurality of available desktop routing servers and the second desktop routing server is different than the first desktop routing server.

In yet another embodiment, the remote desktop client sends the second outgoing message 116 to the remote desktop server via the first desktop routing server and the first remote desktop routing server accesses the observed round trip time 116 of the latency data structure. The first remote desktop routing server allows additional connections from additional remote desktop clients based on the accessed observed round trip time 414. For example, if the observed round trip time 414 indicates an acceptable response time between the remote desktop client and the remote desktop server, first remote desktop routing server allows additional connections from additional remote desktop clients. However, if the observed round trip time 414 indicates an unacceptable response time between the remote desktop client and the remote desktop server, the remote desktop routing server refuses additional connections from additional remote desktop clients.

In yet another embodiment, the remote desktop routing server accesses the observed round trip time 414 of the latency data structure and calculates a performance metric based on the accessed observed round trip time 414.

Figure 6:
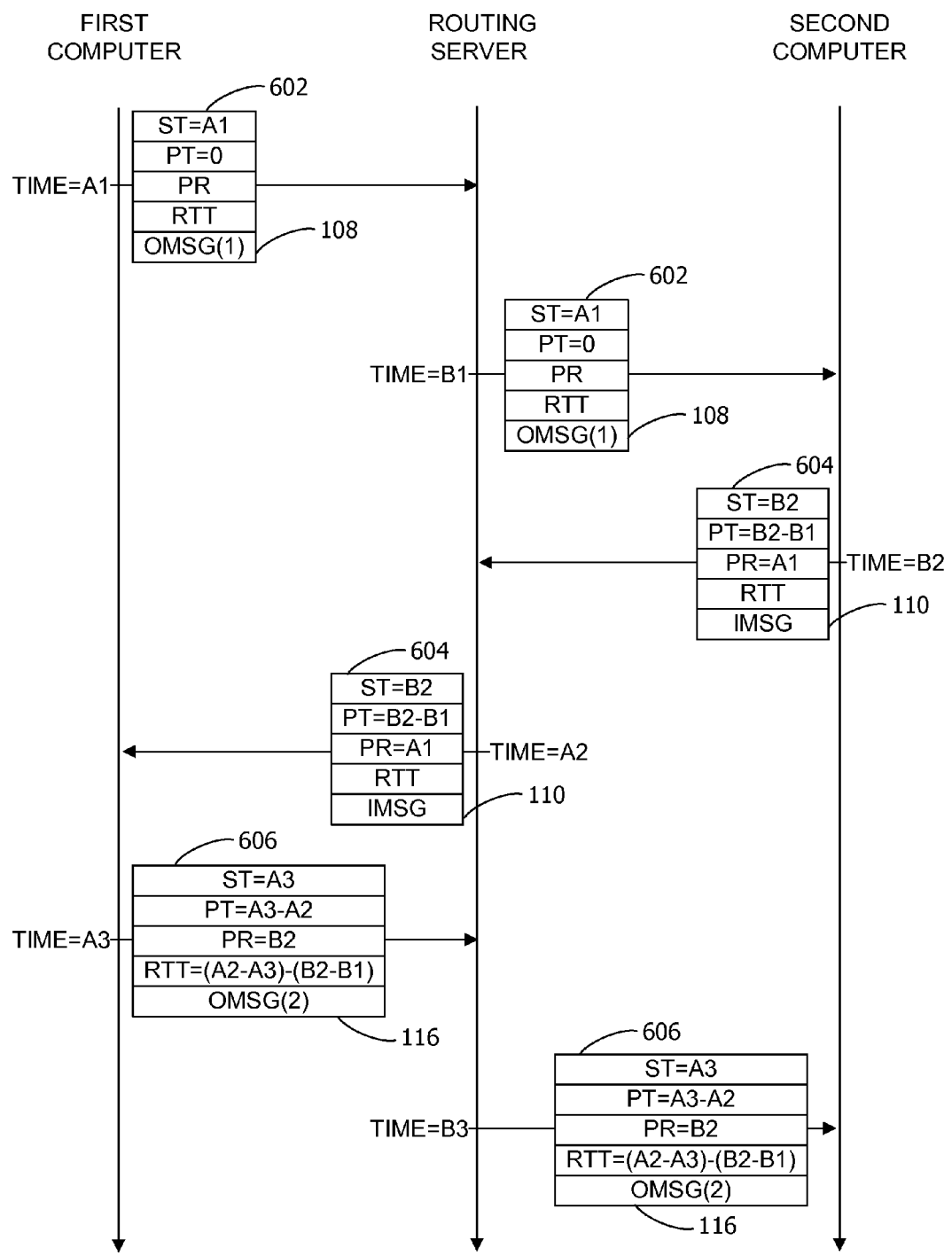
FIG. 6 an exemplary flow diagram illustrating the message flow between the first and second computers.

The following example, as shown in FIG. 6, illustrates the message flow between the first computers 102 and the second computer 104. At time A1, the first computer 102 sends a latency data structure 602 and a first outgoing message 108 to the second computer 104 via the routing server 106. At time A1, the sender time 408=A1, the processing time 410=0, the peer time 412 is unknown, and the observed round trip time 414 is unknown.

At time B1, the second computer 104 receives the latency data structure 602 and the first outgoing message 108. In response to receiving the first outgoing message 108, the second computer 104 generates and sends an incoming message 110 including a latency data structure 604 at time B2. The latency data structure 604 includes the sender time 408=B2, the time the second computer 104 sent the incoming message 110. The processing time 410=B2−B1 and the peer time=A1. The peer time 412 is the time the first computer 102 sent the first outgoing message 108. The peer time 412 of latency data structure 602 corresponds to the sender time included the latency data structure 602. At time B2, the observed round trip time 414 is unknown because only half of the round trip has been completed.

As shown in FIG. 6, at time A2, the first computer 102 receives the latency data structure 604 and the incoming message 110. In response to receiving the incoming message, the first computer 102 generates and sends a second outgoing message 116 including a latency data structure 606 at time A3.

The latency data structure 606 includes the sender time 408=A3, the time the first computer 102 sent the second outgoing message 116. The processing time 410=A3−A2 and the peer time=B2. The peer time 412 is the time the second computer 104 sent the incoming message 110. The peer time 412 of latency data structure 606 corresponds to the sender time included the latency data structure 604. The observed round trip time 414 may be calculated as the time between when the first outgoing message 108 was sent and when the incoming message 110 was received as observed by the first computer 102, minus the time the second computer 104 took to process the first outgoing message 108 as observed by the second computer 104. In other words, the observed round trip time 414=(A2−A1)−(B2−B1) where A2 is the time the time the incoming message 110 was received by the first computer 102. A1 corresponds to the peer time included the latency data structure 604 and (B2−B1) corresponds to the processing time included the latency data structure 604.

At time B3, the second computer 104 receives the latency data structure 606 and the second outgoing message 116. The observed round trip time 414 may be calculated as the time between the incoming message 110 was sent and the time the second outgoing message 116 was received as observed by the second computer 104, minus the time the first computer 102 took to process the incoming message 110 as observed by the first computer 102. In other words, the observed round trip time 414=(B2−B1)−(A3−A2) where A2 is the time the time the incoming message 110 was received by the first computer 102. B2 corresponds to the peer time included the latency data structure 606 and (A3−A2) corresponds to the processing time included the latency data structure 606.

From here, the process can continue indefinitely and the first computer 102 and second computer 104 can calculate the observed round trip time 414 from the latency data structure 404 included in a message (e.g., first outgoing message 108 and incoming message 110) using the technique outlined above. Advantageously, the observed round trip time 414 can be calculated by the first computer 102 and second computer 104 with minimal overhead and without synchronizing the first clock 112 and the second clock 114.

Referring again to FIG. 1, FIG. 1 shows one example of a general purpose computing device in the form of a computer (e.g., first computer 102, second computer 104, and routing server 106). In one embodiment of the invention, a computer such as the first computer 102, second computer 104, and routing server 106 are suitable for use in the other figures illustrated and described herein. The computer has one or more processors or processing units and a system memory.

The computer (e.g., first computer 102, second computer 104, and routing server 106) typically has at least some form of computer readable media. Computer readable media, which include both volatile and nonvolatile media, removable and non-removable media, may be any available medium that may be accessed by the computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer.

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infra-red, and other wireless media, are examples of communication media. Combinations of any of the above are also included within the scope of computer readable media. The drives or other mass storage devices and their associated computer storage media, provide storage of computer readable instructions, data structures, program modules and other data for the computer (e.g., first computer 102, second computer 104, and routing server 106).

The computer (e.g., first computer 102, second computer 104, and routing server 106) may operate in a networked environment using logical connections to one or more remote computers. The remote computer may be a personal computer, a server, a router, a network PC, a peer device or other common network node, and typically includes many or all of the elements described above relative to computer. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

Generally, the data processors of computer (e.g., first computer 102, second computer 104, and routing server 106) are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer (e.g., first computer 102, second computer 104, and routing server 106), embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer (e.g., first computer 102, second computer 104, and routing server 106) executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for determining a round trip latency between first and second computers having a routing server therebetween, said method comprising:

sending a first outgoing message from the first computer to the routing server and from the routing server to the second computer, said first outgoing message including outgoing time information indicative of a time when the first outgoing message was sent by the first computer according to a first clock associated with the first computer, wherein the first outgoing message is encrypted and the outgoing time information is not encrypted;

receiving an incoming message from the second computer to the routing server and from the routing server to the first computer, said incoming message being sent by the second computer in response to receipt of the first outgoing message sent by the first computer, said incoming message including incoming time information indicative of a time when the incoming message was sent by the second computer according to a second clock associated with the second computer, said incoming time information further indicating processing time at the second computer, and said incoming message further including the outgoing time information, wherein the incoming message is encrypted and the incoming time information is not encrypted, and wherein the first computer is a remote desktop client, the second computer is a remote desktop server, the routing server is a remote desktop routing server, and the outgoing and incoming messages are in a remote desktop protocol format;

determining a time when the first computer receives the incoming message according to the first clock;

calculating a first observed roundtrip time for the outgoing and incoming messages as a function of the determined time, the outgoing time information, and the incoming time information, wherein said first observed roundtrip time is equal to the difference between the time when the first outgoing message was sent according to the first clock and the time the incoming message was received according to the first clock, minus the processing time at the second computer as indicated by the incoming time information; and sending a second outgoing message from the first computer to the routing server and from the routing server to the second computer in response to receipt of the incoming message from the second computer, said second outgoing message including the outgoing time information including the calculated first observed roundtrip time, wherein the second outgoing message is encrypted, and wherein the calculated first observed roundtrip time is not encrypted;

wherein the routing server accesses, from the second outgoing message, the non-encrypted first observed roundtrip time;

wherein the routing server calculates a performance metric of the routing server from the accessed, non-encrypted first observed roundtrip time; and wherein the routing server refuses connections from other computers if the calculated performance metric of the routing server is above a threshold and allows additional connections from other computers if the calculated performance metric of the routing server is below the threshold.

2. The method of claim 1, further comprising providing the outgoing time information in a header of the first outgoing message and providing the incoming time information in a header of the incoming message.

3. The method of claim 1, wherein the first clock and second clock are not synchronized.

4. The method of claim 1, wherein, in response to receiving the second outgoing message, the second computer determines a time when the second computer receives the second outgoing message according to the second clock and the second computer calculates a second observed roundtrip time for the incoming message and the second outgoing message as a function of the determined time, the outgoing time information, and the incoming time information, wherein said second observed roundtrip time is equal to the difference between the time when the second outgoing message was sent according to the first clock and the time the incoming message was received according to the second clock, minus the processing time at the first computer as indicated by the incoming time information.

5. A method for selecting, by a first computer, a routing server from a plurality of available routing servers, said first computer sending outgoing messages to a second computer and receiving incoming messages from said second computer, said first computer having a first clock associated therewith and said second computer having a second clock associated therewith, said incoming and outgoing messages being sent via at least one of the plurality of routing servers, said method comprising:

receiving an incoming message from the second computer to the first computer via a first routing server, said first routing server being one of the plurality of available routing servers, said incoming message being sent by the second computer in response to receipt of a first outgoing message sent by the first computer, said incoming message including incoming time information indicative of a time when the incoming message was sent by the second computer according to the second clock associated with the second computer, said incoming time information further indicating processing time at the second computer, and said incoming message further including the outgoing time information, said outgoing time information being indicative of a time when said first outgoing message was sent by the first computer according to the first clock associated with the first computer, wherein the incoming message and the outgoing message are encrypted, and wherein the outgoing time information and the incoming time information are not encrypted, and wherein the first computer is a remote desktop client, the second computer is a remote desktop server, the plurality of routing servers are remote desktop routing servers, and the first and second outgoing messages and the incoming message are in a remote desktop protocol format;

determining a time when the first computer receives the incoming message according to the first clock;

calculating a first observed roundtrip time for the outgoing and incoming messages as a function of the determined time, the outgoing time information, and the incoming time information, wherein said first observed roundtrip time is equal to the difference between the time when the first outgoing message was sent according to the first clock and the time the incoming message was received according to the first clock, minus the processing time at the second computer as indicated by the incoming time information; and wherein:

if the first observed roundtrip time is below a threshold, the first routing server allows additional connections from other computers and the first computer sends a second outgoing message to the second computer via the first routing server, said threshold indicating an acceptable response time between the first computer and second computer; and if the first observed roundtrip time is above the threshold, the first routing server refuses connections from other computers and the first computer sends the second outgoing message to the second computer via a second routing server selected from the plurality of available routing servers, said second routing server being different than the first routing server.

6. The method of claim 5, further comprising providing the outgoing time information in a header of the first and second outgoing messages and providing the incoming time information in a header of the incoming message.

7. The method of claim 5, wherein the first clock and second clock are not synchronized.

* * * * *